April 2, 1968
E. CHOSY ET AL
3,376,062
HINGED COIL WELL COVER
Filed May 2, 1966
3 Sheets-Sheet 2
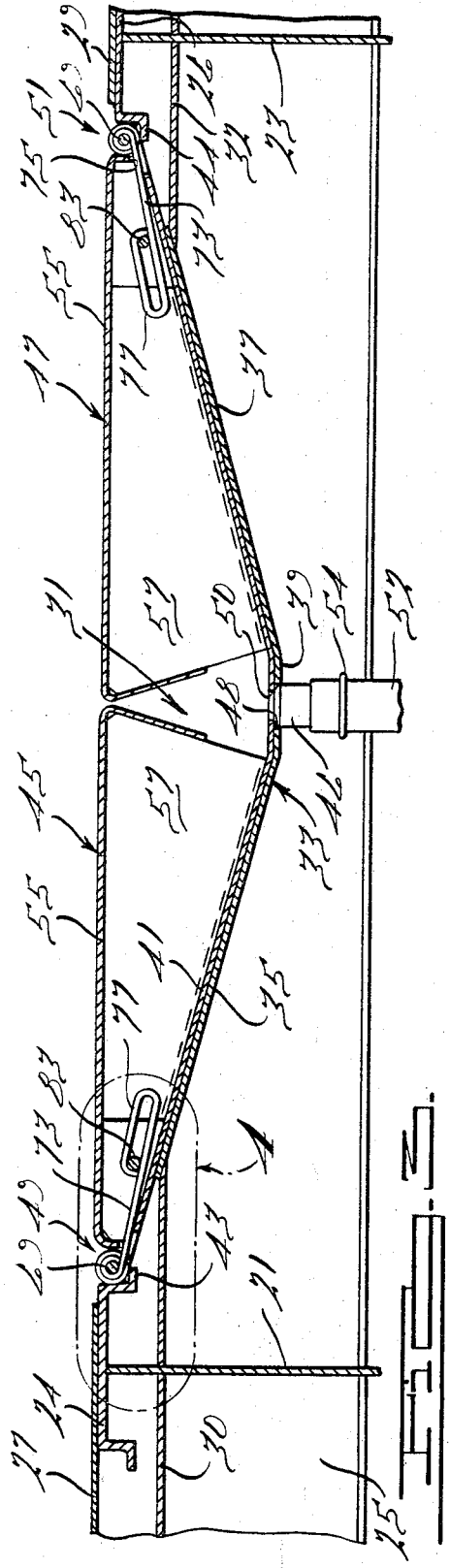
INVENTORS
Eugene Chosy,
Anton Heinrichs
BY Harness, Dickey & Pierce
ATTORNEYS

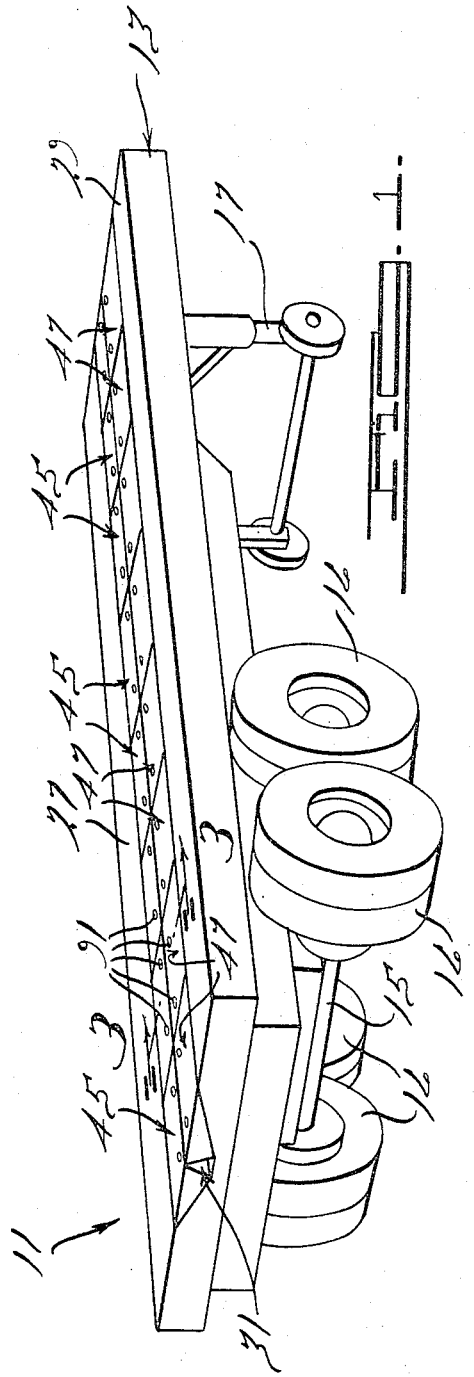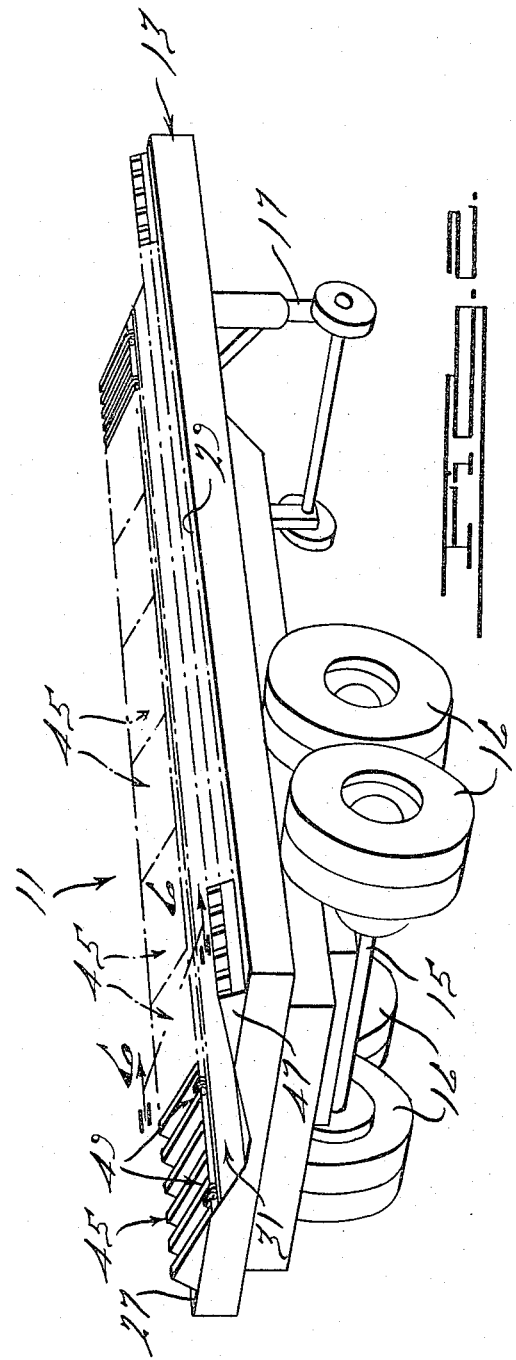

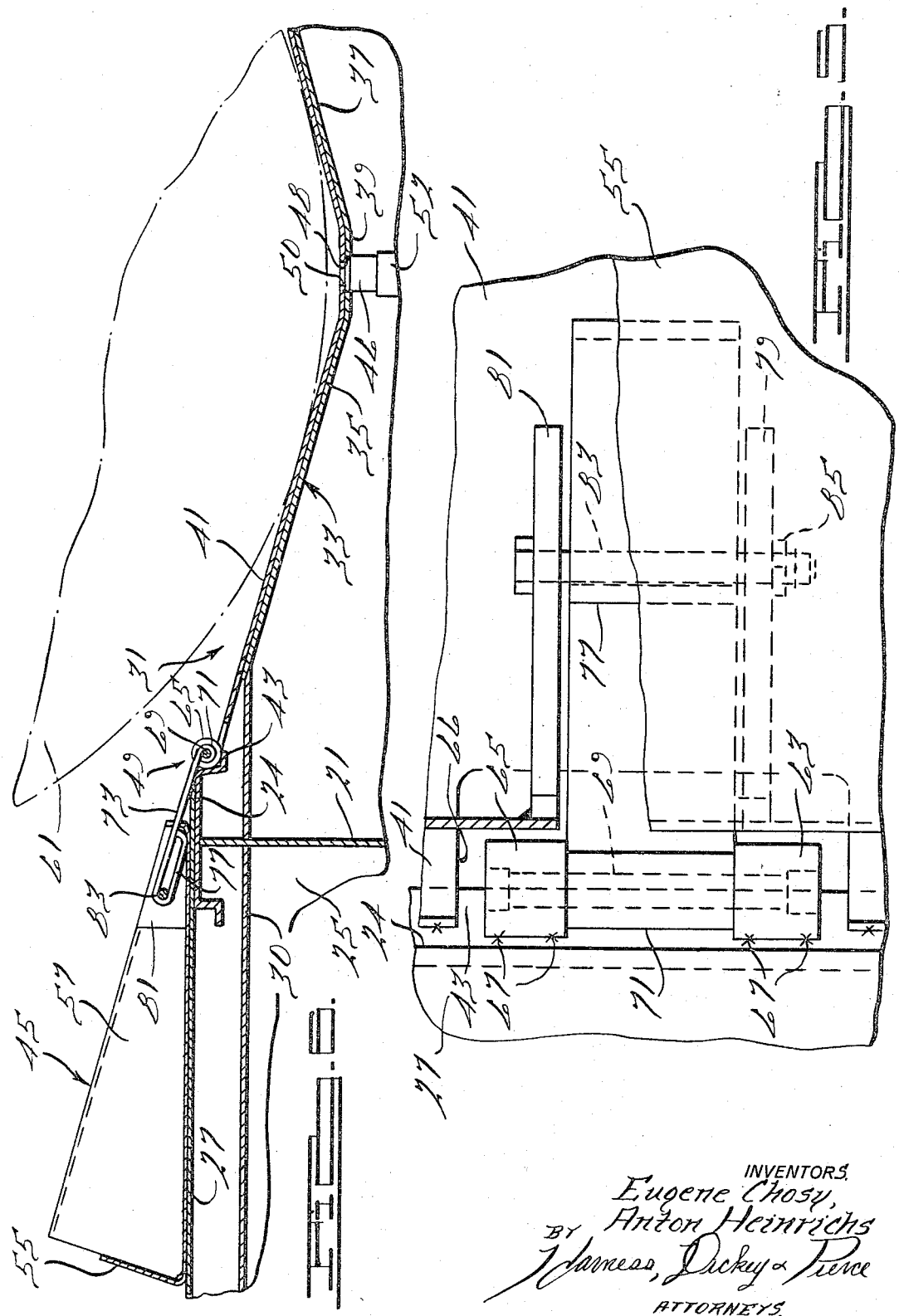

United States Patent Office 3,376,062
Patented Apr. 2, 1968

3,376,062
HINGED COIL WELL COVER
Eugene Chosy, Grosse Pointe Farms, and Anton Heinrichs, Grosse Pointe Woods, Mich., assignors to Fruehauf Corporation, Detroit, Mich., a corporation of Michigan
Filed May 2, 1966, Ser. No. 547,024
4 Claims. (Cl. 296—28)

This invention relates generally to shipping, and particularly to an improved, convertible vehicle floor construction for use in transporting different types of articles.

When transporting certain articles, care must be taken to provide safe and secure support so that the articles cannot shift and become damaged during movement of the transporting vehicle. In transporting certain articles, such as, for example, coiled metal products from a rolling mill, various cradle-like devices are employed to brace coiled stock so that it cannot shift or roll along the vehicle floor and damage itself or other articles nearby.

Frequently, transporting vehicles of the above type are called upon to ship other types of articles together with or apart from coiled stock. For example, rolling mill products also include metal sheets which are conventionally shipped in stacked or palletized packages. The cradle-like bracings used with coiled stock cannot be used with stacked or palletized metal sheets or other flat-bottomed products and the latter require other types of bracing to secure them in place when being transported. As a result, a trucker is required to carry and interchange a number of different bracings to accommodate various types of loads. Thus, an integrated vehicle floor constructed for use in transporting either coiled or flat-bottomed articles or combinations of both would be highly desirable.

An important object of the present invention, therefore, is to provide an integrated floor construction for shipping vehicles adapted to support and brace coiled stock and convertible to receive and support flat-bottomed articles or combinations of both.

A further object of the present invention is to provide a vehicle floor construction of the above character wherein the movable floor components are relatively inaccessible to damage by the articles being shipped.

Additional objects of the present invention include a vehicle floor construction of the above character which is relatively inexpensive to manufacture, rugged in construction and reliable in use.

Other objects and advantages of the present invention will become more apparent from a consideration of the following detailed description and claims taken in conjunction with the drawings in which:

FIGURE 1 is a perspective view illustrating a truck trailer having a floor construction embodying the present invention and shown with the components thereof in position to transport flat-bottomed articles;

FIG. 2 is a view similar to FIG. 1 and showing the floor components in position to receive coiled products;

FIG. 3 is an enlarged sectional view of FIG. 1 taken along the line 3—3 thereof;

FIG. 4 is an enlarged view of a portion of FIG. 3 taken within the enclosure 4;

FIG. 5 is a fragmentary view of FIG. 4 looking in the direction of the arrow 5; and FIG. 6 is a sectional view of FIG. 2 taken along the line 6—6 thereof.

Broadly described, the present invention includes a floor having laterally spaced, horizontal, load-supporting surfaces, a channel between said horizontal surfaces having downwardly tapered surfaces converging toward the center of said channel, at least one pair of laterally spaced covers positionable in said channel, each of said covers having a horizontal upper surface and a tapered lower surface, said lower surfaces when seated on respective ones of the channel tapered surfaces locating the cover upper surfaces substantially coextensive with each other and with said floor horizontal surfaces, hinge means pivotally and slidably interconnecting each said cover with said floor, whereby each said cover is movable from a first position within said channel to a second position outside and spaced laterally from said channel.

Referring now more specifically to the drawings, a truck trailer embodying the present invention is illustrated generally at 11 in FIGS. 1 and 2 and is seen to include a body 13 supported at its rear end by tandem axles 15 and wheels 16. The trailer front end is supported by a landing gear assembly 17 and preferably is constructed for attachment to a truck tractor in the usual manner.

The body 13 is seen in FIGS. 3 and 4 to include laterally spaced, longitudinally extending main beams 21, 23 interconnected by a plurality of transversely extending cross beams 25 (only one of which is shown) secured thereto as by welding. Each of the main beams 21, 23 has a channel shaped cross-sectional cap 24, 26 secured thereto or integral therewith. A pair of laterally spaced flooring plates 27, 29 are seated upon and suitably secured to the caps 24, 26 and define a pair of horizontal, load-supporting surfaces. It will be understood, of course, that in many installations where metal flooring plates 27, 29 are not practical, wooden planks positioned outside the caps 24, 26 may be employed.

According to the present invention, a well or channel 31 extends along the length of the trailer body 13 and is positioned between the load-supporting surfaces defined by the flooring plates 27, 29. To form the channel 31, the cross beams 25 are cut away at their midportions as shown in FIGS. 3 and 4. A pair of structural plates 30, 32 extend inwardly, one from either side of the cross beams 25, and are suitably secured thereto. A base plate 33 having downwardly tapered, converging sides 35, 37 and a flat-bottom 39 is fixed at its outer ends to the structural plates 30, 32. A well plate 41 overlies the base plate 33 and has its side edges welded to inwardly facing flanges 43, 44 on the main beam caps 24, 26, respectively.

The base plate bottom 39 has a drain tube 46 set in an opening 48 therein which communicates with an opening 50 in the well plate 41 to facilitate removal of moisture accumulating within the channel 31. A flexible bleed tube 52 may be secured to the drain tube 46 by a clamp 54 to permit selective draining of the channel 31.

At least one and preferably a plurality of tandem arranged pairs of cover members 45, 47 are removably received in the channel 31. The cover members 45, 47, as shown in FIG. 3, are connected to the main beam caps 24, 26 by a pair of hinges 49, 51, respectively. Each of the cover members 45, 57 includes a plurality of spaced, generally triangular shaped ribs 57 having a plate 55 overlying at least one side thereof and suitably secured thereto. The plate 55 and ribs 57 are constructed so that when the cover members 45, 47 are positioned within the channel 31, as shown in FIGS. 1 and 3, the plates 55 are substantially coplanar with the flooring plates 27, 29 and together therewith form a substantially continuous, horizontal, load-supporting surface. When the cover members 45, 47 are moved out of the channel 31 to the position shown in FIGS. 2 and 6, the channel 31 or a portion thereof is exposed and a coiled product 59, shown by dot-dash lines in FIG. 6, can be set in the channel 31 to rest on the well plate 41. The downwardly tapered, converging sides of the channel 31 prevent the coiled product 61 from shifting so that it remains in place therein.

It will be appreciated that as many pairs of cover members 45, 47 as desired can be moved out of the channel 31 to expose as great a length of the channel as needed to receive the coiled products 61. The remainder of the cover members 45, 47 can remain in place within the channel 31 and provide a substantially continuous, horizontal, load-supporting surface over the rest of the trailer body 13. Furthermore, the cover members 45, 47 implanted in the channel 31 prevent the coiled product or products therewithin from sliding longitudinally thereof.

The hinges 49, 51 connecting the cover members 45, 47 to the body 13 are identical so that a description of hinge 49 will suffice here. It will be understood that like numerals refer to like parts for hinge 51.

As seen in FIGS. 3-6, the hinge 49 includes a spaced pair of spools 63, 65 located within a slot 66 in the well plate 41 and welded to the cap flange 43 and the cap 24 at 67. A pivot pin 69 extends between the spools 63, 65 and has one end 71 of a hinge leaf 73 looped therearound in pivotal relationship therewith. The other end of the hinge leaf 73 extends through a slot 75 in the end of the cover plate 55 and is bent back on itself forming an elongated loop 77. A pair of hinge plates 79, 81 are welded to the end of the cover plate 55 and are positioned one on either side of the hinge leaf 73. A bolt 83 extends between the hinge plates 79, 81 and freely through the elongated loop 77 and is held in place on the plates 79, 81 by a nut 85. Through this construction, the cover members 45, 47 are selectively movable into and out of the channel 31 by hinge-like or pivotal movement about the axis of the pivot pins 69. Furthermore, the arrangement of the bolts 83 and the elongated loops 77 allows the cover members 45, 47 to be slid away from the channel 31 when the cover members are outside the channel as seen in FIG. 6. This is important in that it prevents the coiled product 61 from damaging the cover members 45, 47 even if some side movement of the coiled product occurs.

Another feature of the present invention is the fact that the hinges 49, 51 are set at or below the top surface of the body 13. Thus, by securing these hinges 49, 51 in place seated on the flanges 43 of the main beam caps 24, 26, they are not exposed above the top surface of the body 13 and cannot be damaged by any of the freight disposed thereon. The latitude of movement permitted between the hinges 49, 51 and the cover members 45, 47 through the loop 77 and pin 83 makes subsurface positioning of the hinges 49, 51 possible without any need to taper or bevel the flooring plates 27, 29 or the caps 24, 26.

To facilitate raising of the cover members 45, 47 out of the channel 31, each of the cover plates 55 may have one or more openings 91 therein to permit one to insert his hand or a suitable implement. Alternatively, a hook or other implement may be inserted between the covers 45, 47 to effect raising thereof out of the channel 31.

By the foregoing, there has been disclosed an integrated, convertible floor construction for article transporting vehicles calculated to fulfill the inventive objects set out above; and while a preferred embodiment of the present invention has been illustrated and described in detail herein, various additions, substitutions, modifications and omissions may be made thereto without departing from the spirit of the invention as encompassed by the appended claims.

What is claimed is:

1. In a transporting vehicle, a floor having laterally spaced, horizontal, load-supporting surfaces, a channel between said horizontal surfaces having downwardly tapered surfaces converging toward the center of said channel, at least one pair of laterally spaced covers positionable in said channel, each of said covers having a horizontal upper surface and a tapered lower surface, said lower surfaces, when seated on respective ones of the channel tapered surfaces locating the cover upper surfaces substantially coextensive with each other and with said floor horizontal surfaces, hinge means pivotally and slidably interconnecting each said cover with said floor, whereby each said cover is movable from a first position within said channel to a second position outside and spaced laterally from said channel.

2. A construction as defined in claim 1 wherein each said hinge means includes a first pivot means secured to said floor, a leaf pivoted at one end on said first pivot means and having an elongated loop at its other end, a second pivot means fixed to each said cover member and slidably received in said loop.

3. A construction as defined in claim 1 wherein said first pivot means of each said hinge means is below said load-supporting surfaces.

4. A construction as defined in claim 1 wherein said first pivot means of each said hinge means is positioned within said channel and does not extend above said load-supporting surfaces.

References Cited

UNITED STATES PATENTS

| | | | |
|---|---|---|---|
| 2,071,620 | 2/1937 | Fitch | 105—243 |
| 2,622,918 | 12/1952 | Staffe | 105—367 |
| 2,971,795 | 2/1961 | Winski | 105—367 XR |
| 3,291,072 | 12/1966 | Cunningham | 105—243 XR |

FOREIGN PATENTS 18,655  1/1908  Norway.

BENJAMIN HERSH, *Primary Examiner.*

L. D. MORRIS, *Assistant Examiner.*